US005956677A

United States Patent [19]

Iso

[11] Patent Number: 5,956,677
[45] Date of Patent: *Sep. 21, 1999

[54] SPEECH RECOGNIZER HAVING A SPEECH DATA MEMORY STORING SPEECH DATA AND A REFERENCE PATTERN MEMORY STORING PARTIAL SYMBOL TRAINS OF WORDS FOR RECOGNITION

[75] Inventor: Ken-ichi Iso, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/644,273

[22] Filed: May 10, 1996

[30] Foreign Application Priority Data

May 12, 1995 [JP] Japan .................................. 7-114628

[51] Int. Cl.⁶ ................................................... G10L 5/06
[52] U.S. Cl. ............................................ 704/254; 704/251
[58] Field of Search .................................... 395/2.63–2.67, 395/2.4, 2.45, 2.47; 704/254–258

[56] References Cited

U.S. PATENT DOCUMENTS

| | | | |
|---|---|---|---|
| 4,979,213 | 12/1990 | Nitta | 381/43 |
| 5,123,049 | 6/1992 | Koyama | 381/43 |
| 5,220,609 | 6/1993 | Watanabe et al. | 381/43 |
| 5,222,147 | 6/1993 | Koyama | 381/43 |
| 5,309,547 | 5/1994 | Niyada et al. | 395/2.47 |
| 5,315,689 | 5/1994 | Kanazawa et al. | 395/2.47 |
| 5,345,536 | 9/1994 | Hoshimi et al. | 395/2.52 |
| 5,416,887 | 5/1995 | Shimada | 395/2.42 |
| 5,416,892 | 5/1995 | Loken-Kim | 395/51 |
| 5,432,886 | 7/1995 | Tsukada et al. | 395/2.48 |
| 5,440,663 | 8/1995 | Moese et al. | 395/264 |
| 5,561,722 | 10/1996 | Watari et al. | 395/2.6 |
| 5,577,162 | 11/1996 | Yamazaki | 395/2.41 |
| 5,651,094 | 7/1997 | Takagi et al. | 395/2.53 |

FOREIGN PATENT DOCUMENTS

| | | |
|---|---|---|
| 0 388 067 | 9/1990 | European Pat. Off. . |
| 0 590 173 A1 | 4/1994 | European Pat. Off. . |

OTHER PUBLICATIONS

K. Lee, "Context–Dependent Phonetic Hidden Markov Models for Speaker–Independent Continuous Speech Recognition," IEEE Transactions on Acoustics, Speech and Signal Processing, vol. 38, No. 4, Apr. 1994, pp. 599–609.

*Primary Examiner*—David R. Hudspeth
*Assistant Examiner*—Michael N. Opsasnick
*Attorney, Agent, or Firm*—Foley & Lardner

[57] ABSTRACT

A speech recognizer includes a feature extracting unit for analyzing an input speech to extract a feature vector of the input speech. A speech data memory stores speech data and symbol trains of the input speech. A reference pattern memory stores sets each of a given partial symbol train of a word presented for recognition and an index of speech data with the expression thereof containing the partial symbol train in the speech data memory. A distance calculating unit reads out speech data corresponding to a partial symbol train stored in the reference pattern memory from the speech data memory, and calculates a distance between the partial symbol train read out from the reference pattern memory and a particular section of the input speech. A pattern matching unit derives, with respect to each word presented for recognition, a division of the subject word interval which minimizes the sum of distances of the input speech sections over an entire word interval. A recognition result calculating unit outputs, as a recognition result, a word presented for recognition, which gives the minimum one of the distances between the input speech data output of the pattern matching unit and all the words presented for recognition.

7 Claims, 3 Drawing Sheets

| PHONE SYMBOL OF WORD PRESENTED FOR RECOGNITION | DIVISION FORM |
|---|---|
| A B C D | ( A, B, C, D ) |
| | ( A, BC, D ) |
| | ( A, B, CD ) |
| | ( A, BCD ) |
| | ( AB, C, D ) |
| | ( AB, CD ) |
| | ( ABC, D ) |
| | ( ABCD ) |

SPEECH RECOGNIZER HAVING A SPEECH DATA MEMORY STORING SPEECH DATA AND A REFERENCE PATTERN MEMORY STORING PARTIAL SYMBOL TRAINS OF WORDS FOR RECOGNITION

BACKGROUND OF THE INVENTION

The present invention relates to improvements in speech recognizer reference patterns.

As a method of realizing speech recognition which is capable of ready alteration of vocabularies presented for recognition, a method which uses context-dependent phone reference patterns has been extensively utilized. In this method, a reference pattern of a given word presented for recognition can be produced by connecting context-dependent phone reference patterns of corresponding phone expressions. A context-dependent phone reference pattern of each phone (which is designated as a set of three elements, i.e., a preceding phone, the subject phone and a succeeding phone), is produced by making segmentation of a number of pieces of speech data collected for training in phone units, and averaging selectedly collected phones that are in accord inclusive of the preceding and succeeding phones. Such method is described in, for instance, Kai-Fu Lee, IEEE Transactions on Acoustics, Speech, and Signal Processing, 1990, Vol. 38, No. 4, pp. 599–609. In this method, a speech data base that is used for producing a context-dependent phone reference pattern, is provided separately from the speech recognizer, and it is used only when producing the reference pattern.

FIG. 5 shows a case when producing a context-dependent phone reference pattern from speech data corresponding to a phone train "WXYZ" in the speech data base. Referring to FIG. 5, "X (W, Y)" represents a context-dependent phone reference pattern of the phone X with the preceding phone W and the succeeding phone Y. When identical context-dependent phones appear in different parts of speech data, their average is used as the reference pattern.

In the case where a phone reference pattern is produced by taking the contexts of the preceding and succeeding phone into consideration by the prior art method, including the case shown in FIG. 5, even if there exist speech data in the speech data base that contain the same context as the phone in a word presented for recognition inclusive of the preceding and succeeding two phones, they are not utilized at all for recognition. In other words, in the prior art method, a reference pattern is produced on the basis of phone contexts which are fixed when the training is made. In addition, the phone contexts to be considered are often of one preceding phone and one succeeding phone in order to avoid explosive increase of the number of combinations of phones. For this reason, the collected speech data bases are not effectively utilized, and it has been impossible to improve the accuracy of recognition.

SUMMARY OF THE INVENTION

An object of the present invention is therefore to provide a speech recognizer capable of improving speech recognition performance through improvement in the speech reference pattern accuracy.

According to the present invention, there is provided a speech recognizer comprising: a speech data memory in which speech data and symbol trains thereof are stored; and a reference pattern memory in which are stored sets each of a given partial symbol train of a word presented for recognition and an index of speech data with the expression thereof containing the partial symbol train in the speech data memory.

The speech recognizer further comprises a distance calculating unit for calculating a distance between the partial symbol train stored in the reference pattern memory and a given input speech section, and a pattern matching unit for selecting, among possible partial symbol trains as divisions of the symbol train of a word presented for recognition, a partial symbol train which minimizes the sum of distances of input speech sections over the entire input speech interval, and outputting the distance sum data at this time as data representing the distance between the input speech and the word presented for recognition. The distance to be calculated in the distance calculating unit is the distance between a given section corresponding to the partial train of symbol train expression of speech data stored in the speech data memory and the given input speech section.

According to a concrete aspect of the present invention, there is provided a speech recognizer comprising: a feature extracting unit for analyzing an input speech to extract a feature vector of the input speech; a speech data memory in which speech data and symbol trains thereof are stored; a reference pattern memory in which are stored sets each of a given partial symbol train of a word presented for recognition and an index of speech data with the expression thereof containing the partial symbol train in the speech data memory; a distance calculating unit for reading out speech data corresponding to a partial train stored in the reference pattern memory from the speech data memory and calculating a distance between the corresponding section and a given section of the input speech; a pattern matching unit for deriving, with resect to each word presented for recognition, a division of the subject word interval which minimizes the sum of distances of the input speech sections over the entire word interval; and a recognition result calculating unit for outputting as a recognition result a word presented for recognition, which gives the minimum one of the distances between the input speech data output of the pattern matching unit and all the words presented for recognition.

Other objects and features will clarified from the following description with reference to attached drawings.

DETAILED DESCRIPTION OF THE PREFERRED EMBODIMENT

Figure 1:
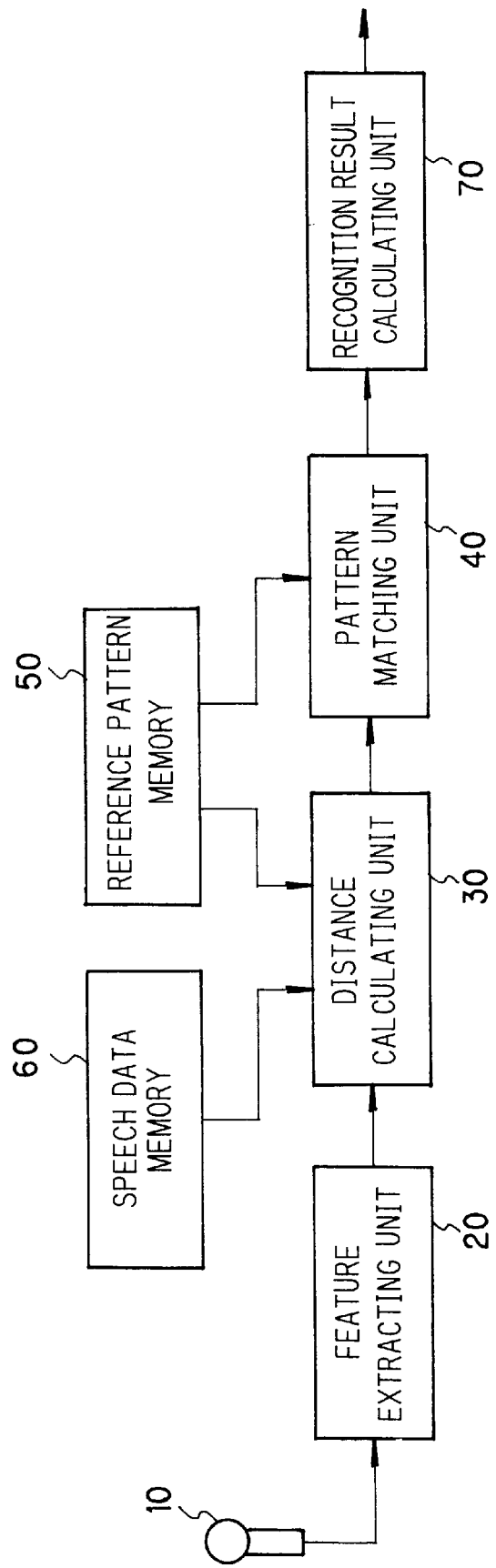
FIG. 1 is a block diagram showing the basic construction of an embodiment of the speech recognizer according to the present invention.

Now, an embodiment of the speech recognizer according to the present invention will be described with reference to the drawings. FIG. 1 is a block diagram showing the basic construction of this embodiment of the speech recognizer. Referring to FIG. 1, a feature extracting unit 20 analyzes an input speech inputted from a microphone 10, extracts a feature vector and supplies the extracted feature vector train to a distance calculating unit 30. The distance calculating unit 30 reads out speech data corresponding to a partial train stored in a reference pattern memory 50 from a speech data memory 60 and calculates the distance between the corresponding section and a given section of the input speech. A pattern matching unit 40 derives, with respect to each word presented for recognition, a division of the subject word interval which minimizes the sum of distances of the input speech sections over the entire word interval. A recognition result calculating unit 70 outputs as the recognition result a word presented for recognition, which gives the minimum one of the distances between the input speech data output of the pattern matching unit 40 and all the words presented for recognition.

Figures 2, 3:
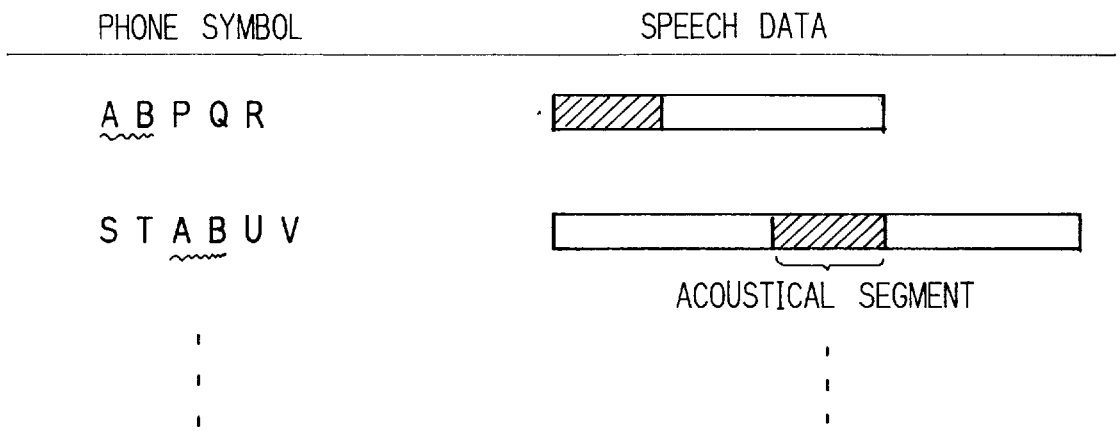
FIGS. 2 to 4 are drawings for explaining operation of the embodiment of the speech recognizer of FIG. 1.

The operation of the embodiment of the speech recognizer will now be described in detail with reference to FIGS. 2 to 4 in addition to FIG. 1. According to the present invention, a number of pieces of speech data and speech context phone expressions thereof are prepared and stored in the speech data memory 60. A reference pattern of a word to be recognized is produced as follows:

(1) Partial trains of phone symbols of a word presented for recognition, are prepared such that they have given lengths (without overlap or missing), as shown in FIG. 2.

(2) Then, as shown in FIG. 3, all speech data portions with phones containing a partial symbol train among the speech data in a speech data base are retrieved.

A combination of possible partial symbol trains as divisions of a word presented for recognition and corresponding speech data portions, is stored as a reference pattern of the word presented for recognition in the reference pattern memory 50. The distance between the input speech data in the pattern matching unit 40 and each word presented for recognition, is defined as follows.

(a) A specific division of the word presented for recognition is selected from the reference pattern memory 50. The phone symbol train of the word presented for recognition is denoted by W, and the division of the symbol train into N partial symbol trains is denoted by $\omega(1), \omega(2) \ldots, \omega(N)$.

(b) From the speech data stored in the speech data memory 60, with the symbol train containing partial symbol trains each defined by a selected division, a given segment of the speech is derived as an acoustical segment of that partial symbol train (FIG. 3).

Among the speech data with the symbol train thereof containing partial symbol trains $\omega(n)$, a k-th speech data portion is denoted by $A[\omega(n),k]$, (k=1 to K(n)). The acoustical segment in a section of the speech data from time instant $\sigma$ until time instant $\tau$, is denoted by $A[\omega(n),k,\sigma\tau]$.

Figure 4:
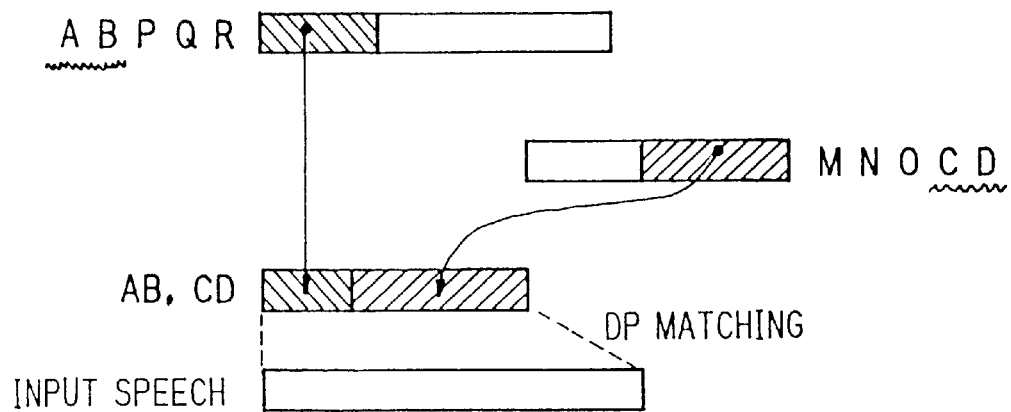
Figure 5:
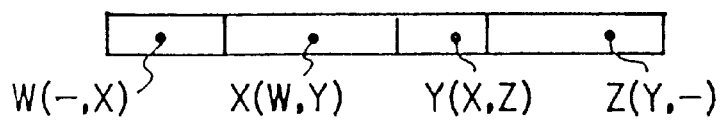
FIG. 5 is a drawing for explaining a prior art speech recognizer in a case when producing a context-dependent phone reference pattern from speech data corresponding to a phone train "WXYZ" in a speech data base.

(c) As shown in FIG. 4, a distance between that obtained by connecting acoustical segments and the input speech, is calculated in accordance with the sequence of partial symbol trains in the pattern matching unit 40 by DP matching or the like.

Denoting the acoustical segment in a section of the input speech from the time instant s until the time instant t by $X[s,t]$, the distance D is given by the following formula (1).

$$D = \Sigma^{N}_{n=1} d(X[s(n),t(n)], A[\omega(n),k,\sigma(n), \tau n)] \qquad (1)$$

where d is the acoustic distance which is calculated in the distance calculating unit 30.

For continuity, it is necessary to meet a condition given as:

$$s(1) = 1 \qquad (2)$$
$$s(2) = t(1) + 1$$
$$s(3) = t(2) + 1$$

-continued $$\vdots$$
$$s(N) = t(n) + 1$$
$$t(N) = T$$

where T is the time interval of the input speech.

(d) By making the division of the symbol train into all possible partial symbol trains in step (c) and obtaining all possible sections (s,t,σ,τ) in the step (b), a partial symbol train which gives a minimum distance is selected in a step (c), and this distance is made as the distance between the input speech and the word presented for recognition.

The recognition result calculating unit 70 provides as the speech recognition result a word presented for recognition giving the minimum distance from the input speech in the step (d) among a plurality of words presented for recognition. In the above way, the speech recognizer is operated. It is possible of course to use the recognition results obtainable with the speech recognizer according to the present invention as the input signal to a unit (not shown) connected to the output side, such as a data processing unit, a communication unit, a control unit, etc.

According to the present invention, a set of three phones, i.e., one preceding phone, the subject phone and one succeeding element, is by no means limitative, but it is possible to utilize all speech data portions of words presented for recognition with identical phone symbol train and context (unlike the fixed preceding and succeeding phones in the prior art method) that are obtained through retrieval of the speech data in the speech data base when speech recognition is made. As for the production of acoustical segments, what is most identical with the input speech is automatically determined at the time of the recognition. It is thus possible to improve the accuracy of reference patterns, thus providing improved recognition performance.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed is:

1. A speech recognizer comprising:

a speech data memory in which unfragmented speech data and symbol trains thereof are stored;

a reference pattern memory in which are stored sets, each of a given partial symbol train of a word presented for recognition, and an index of speech data with an expression thereof containing the given partial symbol train in the speech data memory, wherein no speech data is stored in the reference pattern memory;

a feature extracting unit for receiving an input speech signal, for extracting spectral features from the input speech signal, and for outputting the extracted spectral features as a spectral feature train;

a distance calculating unit for calculating a distance between the given partial symbol train stored in the reference pattern memory and the spectral feature train received from the feature extracting unit; and a pattern matching unit for selecting, among all possible combinations of partial symbol trains as divisions of the symbol train of a word presented for recognition, a partial symbol train which minimizes a sum of distances of input speech sections over an entire input speech interval of the input speech signal, and outputting the sum of distances as data representing a distance between the given input speech section and the word presented for recognition, wherein the selected partial symbol train is output as a word recognition result of the speech recognizer.

2. The speech recognizer according to claim 1, wherein the distance to be calculated in the distance calculating unit is the distance between the partial train of symbol train expression of speech data stored in the speech data memory and the given input speech section.

3. A speech recognizer comprising:

a feature extracting unit for analyzing an input speech to extract a feature vector of the input speech;

a speech data memory in which unfragmented speech data and symbol trains thereof are stored;

a reference pattern memory in which are stored sets, each of a given partial symbol train of a word presented for recognition, and an index of speech data with the expression thereof containing the partial symbol train in the speech data memory, wherein no speech data is stored in the reference pattern memory;

a distance calculating unit for reading out speech data corresponding to a partial symbol train stored in the reference pattern memory from the speech data memory and calculating a distance between the partial symbol train read out from the reference pattern memory and a particular section of the input speech;

a pattern matching unit for deriving, with respect to each word presented for recognition, a division of the subject word interval which minimizes the sum of distances of the input speech sections over an entire word interval; and a recognition result calculating unit for outputting, as a recognition result, a word presented for recognition, which gives the minimum one of the distances between the input speech data output of the pattern matching unit and all the words presented for recognition.

4. A speech recognizing method, comprising the steps of:

a) storing, in a reference pattern memory, a plurality of reference patterns respectively corresponding to a plurality of words for recognition, each of said plurality of reference patterns corresponding to a particular sequence of phoneme symbols of a corresponding one of the plurality of words for recognition;

b) receiving an input speech signal and extracting a plurality of feature vectors as a feature vector train of the input speech signal;

c) partitioning each word for recognition into a plurality of word for recognition phone symbols, the plurality of word for recognition phone symbols for each word for recognition being partitioned into the particular sequence;

d) forming sets of said plurality of word for recognition phone symbols, each of said sets having said plurality of word for recognition phone symbols having the particular sequence as in the step c), one of said sets corresponding to said plurality of word for recognition phone symbols as partitioned in the step c), all others of said sets corresponding to at least one combination of two sequential ones of said plurality of word for recognition phone symbols into a combined word for recognition phone symbol;

e) creating a candidate word for recognition for each of said sets formed in the step d) by combining respective acoustical segments of reference speech data that is obtained from a speech data memory;

f) comparing said feature vector train to a plurality of candidate words for recognition respectively corresponding to different combinations of said plurality of phone symbols stored in said reference pattern memory to determine a corresponding sum of distance data, said sum of distance data representing a distance between said said feature vector train and said different combinations of said plurality of phone symbols stored in said reference pattern memory; and f) determining which one of said different combinations of said plurality of phone symbols stored in said reference pattern memory has a minimum distance of said sum of distance data, said one being output as a most-likely candidate word for each word for recognition, wherein the most-likely candidate word is a speech recognition output for the input speech signal.

5. The method according to claim 4, wherein each of the plurality of word for recognition phone symbols has a fixed length.

6. The method according to claim 5, wherein the combined word for recognition phone symbol has a length at least twice as long as the fixed length.

7. A speech recognizer, comprising:

an input unit configured to receive an input speech signal;

a feature extracting unit communicatively coupled to the input unit and configured to extract feature vectors from the input speech signal and to output a feature vector train as a result;

a speech data memory configured to store speech data;

a reference pattern memory configured to store sets of phoneme symbol trains as divisions of a plurality of words for recognition, wherein each of the sets corresponds to a particular sequential pattern of phoneme symbol trains combined in a different manner with respect to all other sets for the particular sequential pattern of phoneme symbol trains;

a distance calculating unit communicatively coupled to the reference pattern memory and the speech data memory, the distance calculating unit configured to retrieve all possible sets of phoneme symbol trains from the reference pattern memory for a word for recognition, and to obtain corresponding partial words from the speech data memory that make up each of the retrieved sets, and configured to create a reference word candidate based on the obtained partial words for each of the retrieved sets and to calculate a distance between the feature vector train of the input speech signal and each reference word candidate;

a pattern matching unit communicatively coupled to the distance calculating unit and the reference pattern memory, the pattern matching unit configured to determine which of the reference word candidates has a minimum distance with respect to the feature vector train of the input speech signal; and a recognition result calculation unit communicatively coupled to the pattern matching unit and configured to output, as a word for recognition, one of the reference word candidates having the minimum distance with respect to the feature vector train of the input speech signal.

* * * * *